(12) United States Patent
Lai et al.

(10) Patent No.: US 10,607,636 B1
(45) Date of Patent: Mar. 31, 2020

(54) SYSTEM FOR TRANSITION CURVATURE IMPROVEMENT ON A THERMALLY ASSISTED MAGNETIC RECORDING

(71) Applicant: SAE Magnetics (H.K.) Ltd., Hong Kong (HK)

(72) Inventors: Wai Yuen Anthony Lai, Hong Kong (HK); Shun Kit Ma, Hong Kong (HK)

(73) Assignee: SAE MAGNETICS (H.K.) LTD., Hong Kong (HK)

( * ) Notice: Subject to any disclaimer, the term of this patent is extended or adjusted under 35 U.S.C. 154(b) by 0 days.

(21) Appl. No.: 16/656,596

(22) Filed: Oct. 18, 2019

Related U.S. Application Data

(62) Division of application No. 16/198,869, filed on Nov. 22, 2018.

(51) Int. Cl.
| | |
|---|---|
| *G11B 5/31* | (2006.01) |
| *G11B 5/127* | (2006.01) |
| *G11B 5/147* | (2006.01) |
| *G11B 5/60* | (2006.01) |
| *G11B 5/187* | (2006.01) |
| *G11B 5/00* | (2006.01) |

(52) U.S. Cl.
CPC ............. *G11B 5/3116* (2013.01); *G11B 5/00* (2013.01); *G11B 5/1278* (2013.01); *G11B 5/147* (2013.01); *G11B 5/1871* (2013.01); *G11B 5/314* (2013.01); *G11B 5/3146* (2013.01); *G11B 5/3153* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| 9,786,303 B1 * | 10/2017 | Rea ........................ G11B 5/314 |
| 2009/0052092 A1 * | 2/2009 | Zhou ..................... G11B 5/1278 360/313 |
| 2010/0321815 A1 * | 12/2010 | Zhou ..................... G11B 5/1871 360/59 |
| 2018/0047418 A1 * | 2/2018 | Li ......................... G11B 5/3116 |

FOREIGN PATENT DOCUMENTS

JP        2002133608 A  *  5/2002  ............. G11B 5/127

OTHER PUBLICATIONS

English-machine translation of JP 2002133608A, Akiyama et al., published on May 10, 2002. (Year: 2002).*

* cited by examiner

*Primary Examiner* — William J Klimowicz

(57) ABSTRACT

A system for transition curvature improvement on thermally assisted magnetic recording, includes: an energy source, a thermally assisted magnetic recording head including a magnetic main pole for writing of a thermally assisted magnetic recording medium, a waveguide for directing an energy produced by the energy source, and a PPG including a peg and adjacent to the waveguide, the PPG being for turning the energy into a surface plasmon which travels down the peg to heat the thermally assisted magnetic recording medium. The magnetic main pole includes a first portion enabling a first magnetic field strength and at least one additional portion enabling a magnetic field strength stronger than the first magnetic field strength such that a magnetic field of the magnetic main pole along a horizontal direction thereof enables generation of a substantially straight transition curve while writing on the thermally assisted magnetic recording medium.

6 Claims, 16 Drawing Sheets

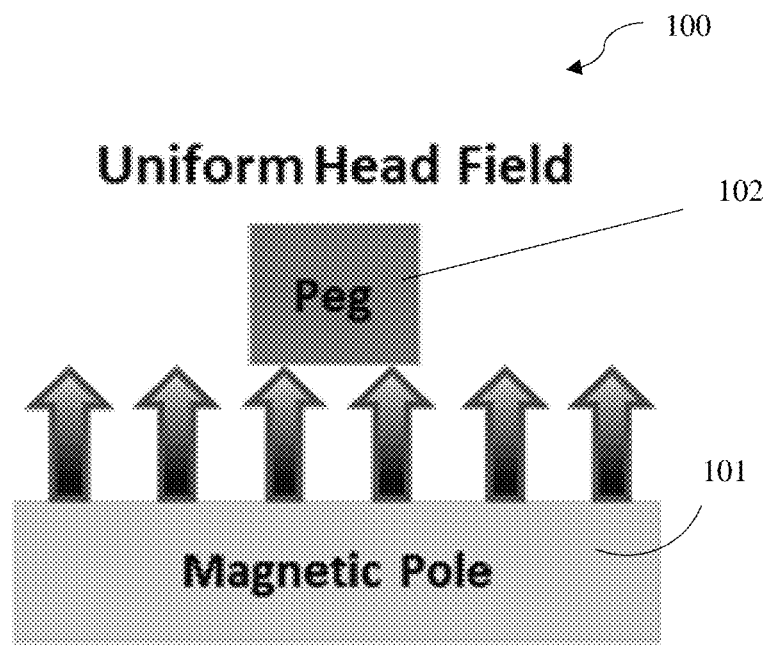
Fig 1 (a) (Prior Art)
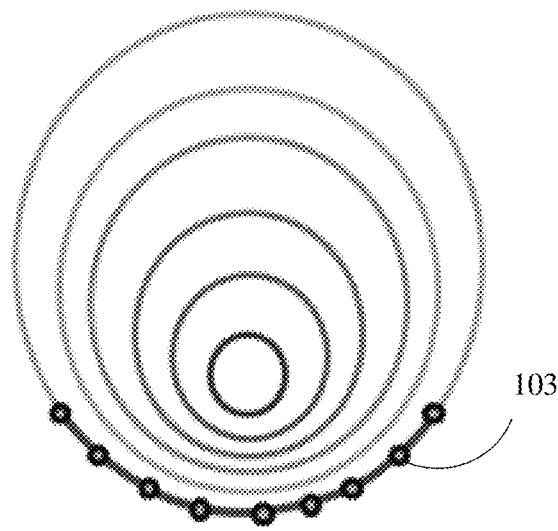
Fig 1 (b) (Prior Art)

Straight Transition Curvature

Straight Transition Curvature

SYSTEM FOR TRANSITION CURVATURE IMPROVEMENT ON A THERMALLY ASSISTED MAGNETIC RECORDING

CROSS REFERENCE TO RELATED APPLICATIONS

The present application is a Divisional Application of U.S. application Ser. No. 16/198,869 filed on Nov. 22, 2018, the contents of which are incorporated herein by reference in their entirety.

TECHNICAL FIELD

The present application described herein, in general, relates to the field of thermally assisted magnetic recording. In particular, the present application relates to a system for transition curvature improvement on a thermally assisted magnetic recording.

BACKGROUND

Recently, thermally assisted magnetic recording (TAMR), which is also known in the art as heat assisted magnetic recording (HAMR), is gaining importance in the technological race. A conventional magnetic main pole of a thermally assisted magnetic recording is made by a single type of material. Thus, the field generated from the magnetic main pole will be similar within the magnetic main pole. In case of writing on the thermally assisted magnetic recording, due to a round shape of thermal zone, combined with a uniform magnetic field strength along magnetic main pole horizontal direction, the writing position of the thermally assisted magnetic recording is along the thermal zone. This results in a round shape transition curvature. The round shape transition curvature resembles a poor transition curvature.

Thus, there is a long-standing need of a system for transition curvature improvement on a thermally assisted magnetic recording which will increase bit density and areal density capacity.

SUMMARY

This summary is provided to introduce concepts related to a system for transition curvature improvement on a thermally assisted magnetic recording and the concepts are further described below in the detailed description. This summary is not intended to identify essential features of the claimed subject matter nor is it intended for use in determining or limiting the scope of the claimed subject matter.

In one embodiment, a system for transition curvature improvement on a thermally assisted magnetic recording is disclosed. The system may comprise an energy source such as laser, a thermally assisted magnetic recording medium, a thermally assisted magnetic recording head further comprising a waveguide, a magnetic main pole, and a planar plasmon generator (PPG) comprising a peg. The magnetic main pole may facilitate for writing of a thermally assisted magnetic recording medium. The waveguide may facilitate for directing an energy. The planar plasmon generator (PPG) may be adjacent to the waveguide and facilitate for turning the energy into a surface plasmon which travels along down the peg to heat the thermally assisted magnetic recording medium. The magnetic main pole may comprise a first portion enabling a first magnetic field strength and at least one additional portion enabling a magnetic field strength stronger than the first magnetic field strength. The magnetic field of the magnetic main pole along a horizontal direction thereof may enable generation of a substantially straight transition curve while writing on the thermally assisted magnetic recording medium.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 1(a) and FIG. 1(b) illustrate a conventional magnetic main pole and a transition curve of the conventional magnetic main pole.

DETAILED DESCRIPTION

Figure 2A:
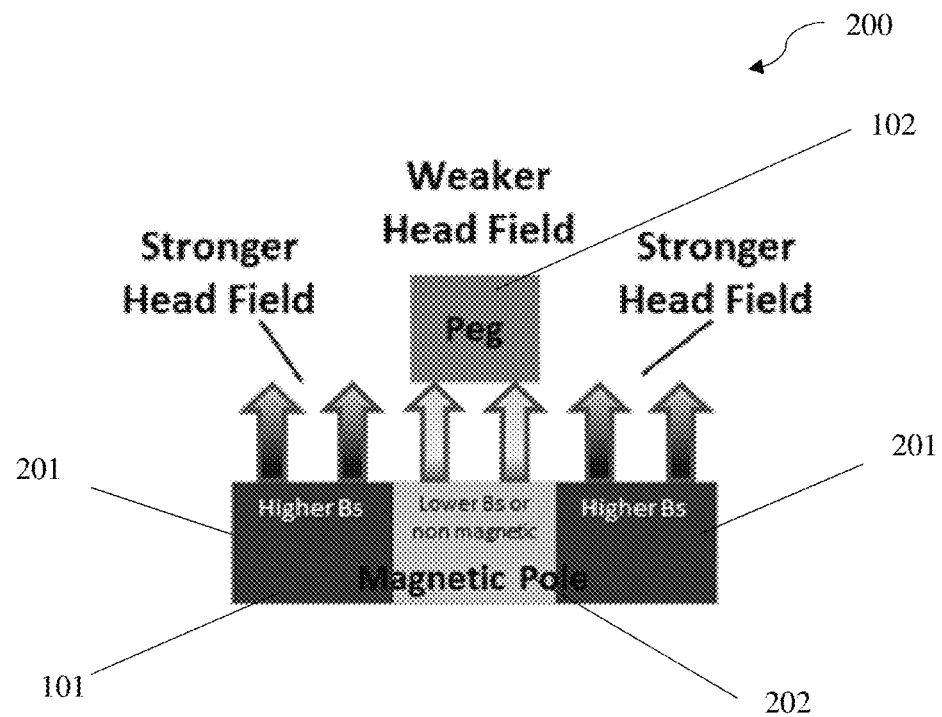
FIG. 2(a) and FIG. 2(b) illustrate a hybrid material magnetic main pole and a transition curve of the hybrid material magnetic main pole, in accordance with an embodiment of the present application.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Further-more, the particular features, structures or characteristics may be combined in any suitable manner in one or more embodiments.

Referring to FIG. 1(a) and FIG. 1(b), main portions of a conventional thermally assisted magnetic recording head 100 and a transition curve 103 obtained for the conventional thermally assisted magnetic recording head 100 are illustrated. Main portions of the conventional thermally assisted magnetic recording head 100 include a magnetic pole 101 (hereinafter also referred to as magnetic main pole 101 interchangeably) for writing on a recording medium and a peg 102 for heating a precise point on the recording medium. The magnetic main pole 101 (as shown in FIG. 1(a)) may be made by a single type of material. Thus, the field generated from the magnetic main pole 101 will be similar within the entirety of the magnetic main pole 101. In case of writing on the thermally assisted magnetic recording (TAMR), the writing position of the thermally assisted magnetic recording (TAMR) may be along the thermal zone. This may be due to a round shape of a thermal zone, combined with a uniform magnetic field strength along the horizontal direction of the magnetic main pole 101. This may result in a round shape transition curvature (shown in FIG. 1(b)). The round shape transition curvature obtained resembles a poor transition curvature 103, and hence improvement in the transition curvature of the magnetic main pole is desired.

Figure 2B:
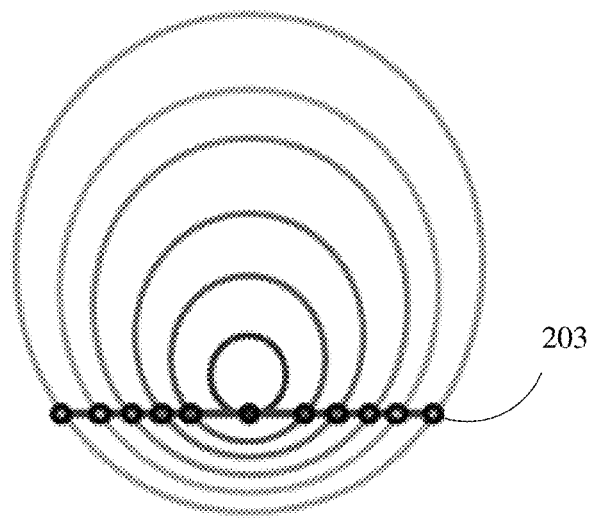

Referring to FIG. 2(a) and FIG. 2(b), main portions of a thermally assisted magnetic recording head 200 and a transition curve 203 obtained for the thermally assisted magnetic recording head 200 are illustrated, in accordance with an embodiment of the present application. The limitations of the conventional thermally assisted magnetic recording head 100 may be overcome by the thermally assisted magnetic recording head 200. Main portions of the thermally assisted magnetic recording head 200 include a magnetic main pole 101 for writing on a recording medium and a peg 102 for heating a precise point on the recording medium. The hybrid material type of magnetic main pole 101 may generate a different field strength along the horizontal direction of the magnetic main pole 101. This enables to improve the transition curvature and then to increase bit density and areal density capacity. The hybrid material type of magnetic main pole 101 may include a high saturated magnetic flux density material 201 at outer side of the magnetic main pole 101 and a low saturated magnetic flux density or non-magnetic material 202 at the center of magnetic main pole 101. The hybrid material magnetic main pole 200 may enable generation of a large head field strength at the outer side of the magnetic main pole 101 combined with lower medium temperature region. The hybrid material magnetic main pole 101 may further enable generation of a smaller head field strength at the center of the magnetic main pole 101 combined with higher medium temperature region. In one embodiment, the hybrid material thermally assisted magnetic recording head 200 may enable an overall writing position of the thermally assisted magnetic recording to be optimized with corresponding required medium temperature which may further facilitate in a linear transition curvature 203 along the horizontal direction.

Figure 3A:
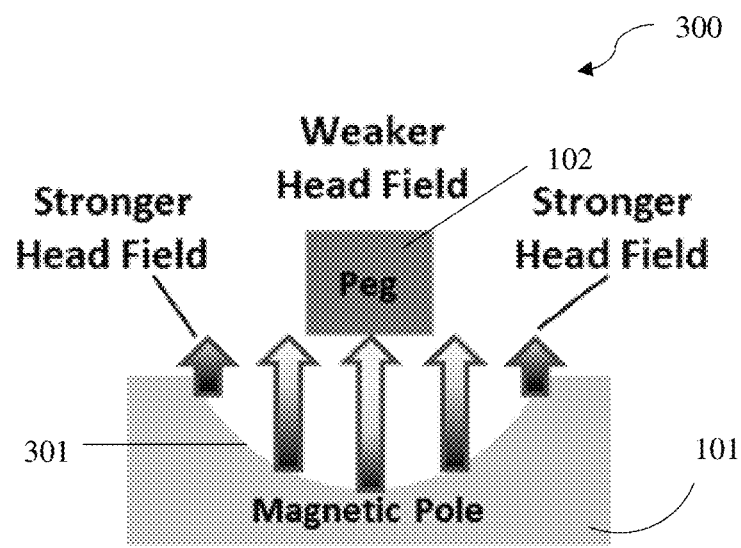
FIG. 3(a) and FIG. 3(b) illustrate a notch magnetic main pole and a transition curve of the notch magnetic main pole, in accordance with an embodiment of the present application.
Figure 3B:
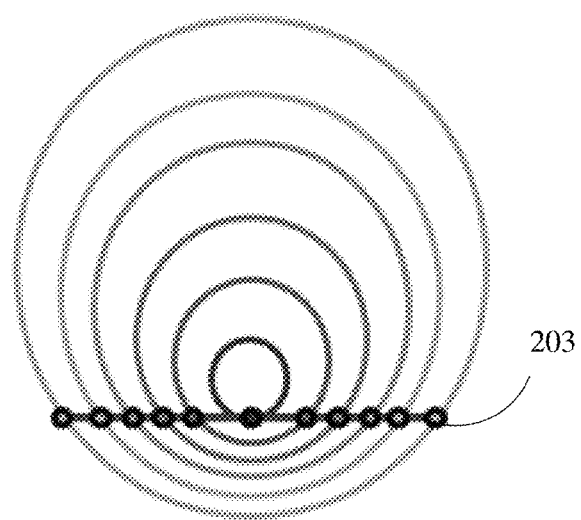
Figure 4:
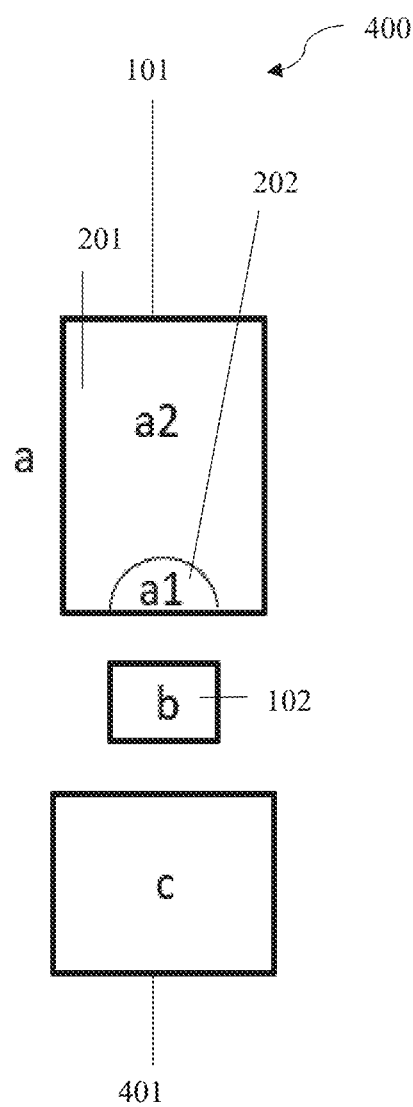
FIG. 4(a), FIG. 4(b), FIG. 4(c), FIG. 4(d), FIG. 4(e), FIG. 4(f), and FIG. 4(g) illustrate two rectangle structure variations of a magnetic main pole, of a thermally assisted magnetic recording head, in accordance with an embodiment of the present application.
Figure 4:
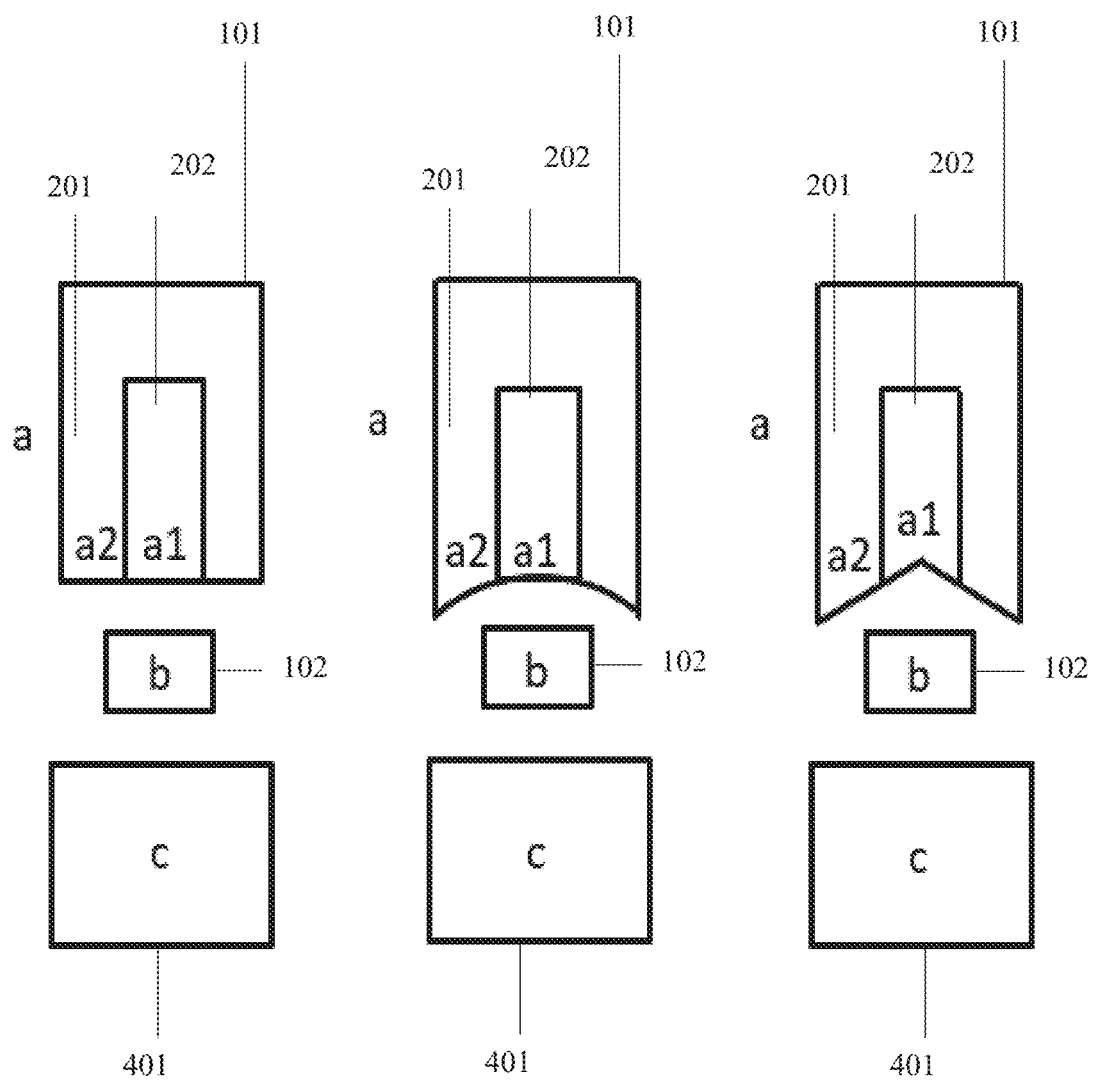
Figure 4:
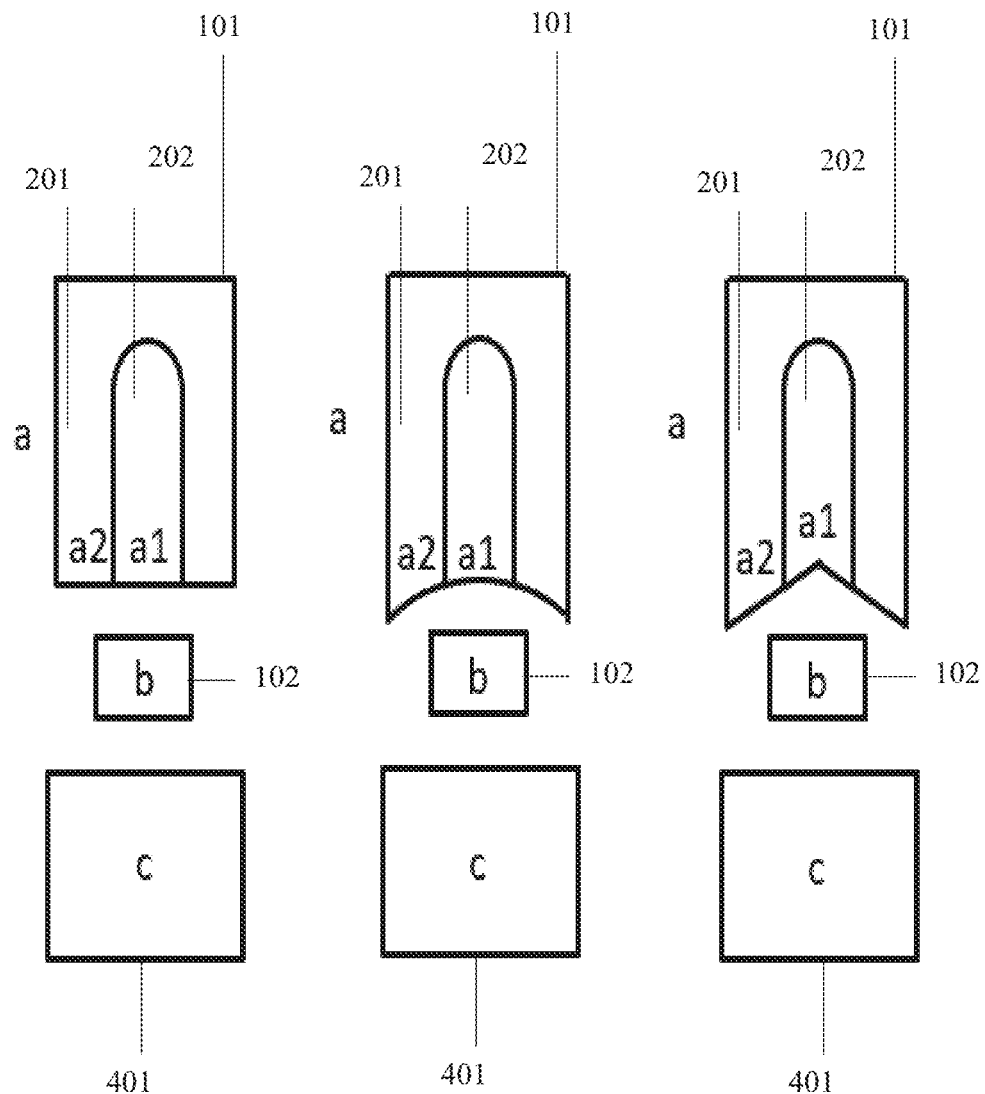

Referring to FIG. 3(a) and FIG. 3(b), a notch thermally assisted magnetic recording head 300 and its respective transition curve, is illustrated in accordance with an embodiment of the present application. In one embodiment, the notch thermally assisted magnetic recording head 300 may comprise a magnetic main pole 101 with a notch shaped curve 301. The notch shaped curve 301 may facilitate in transition curvature improvement on a thermally assisted magnetic recording. The notch magnetic main pole is another approach to achieve different magnetic field across the magnetic main pole 101 in horizontal direction.

Referring to FIG. 4(a), FIG. 4(b), FIG. 4(c), FIG. 4(d), FIG. 4(e), FIG. 4(f), and FIG. 4(g), illustrate two rectangle structure variations of a magnetic main pole 101, of a thermally assisted magnetic recording head 400 facilitating transition curvature improvement on a thermally assisted magnetic recording, in accordance with an embodiment of the present application. In one embodiment, the thermally assisted magnetic recording head 400 may include a magnetic main pole 101, a peg 102 and a waveguide 401. The magnetic main pole 101 may include a high saturated magnetic flux density material 201 at an outer side (a2) of the magnetic main pole 101 and a low saturated magnetic flux density or non-magnetic material 202 at the center (a1) of the magnetic main pole 101.

FIG. 4(a), FIG. 4(b), FIGS. 4(c), 4(d), 4(e), 4(f), and 4(g) illustrates various shapes and configurations of the low saturated magnetic flux density or non-magnetic material 202 at the center (a1) of magnetic main pole 101 and the high saturated magnetic flux density material 201 at the outer side (a2) of magnetic main pole 101.

Figure 5:
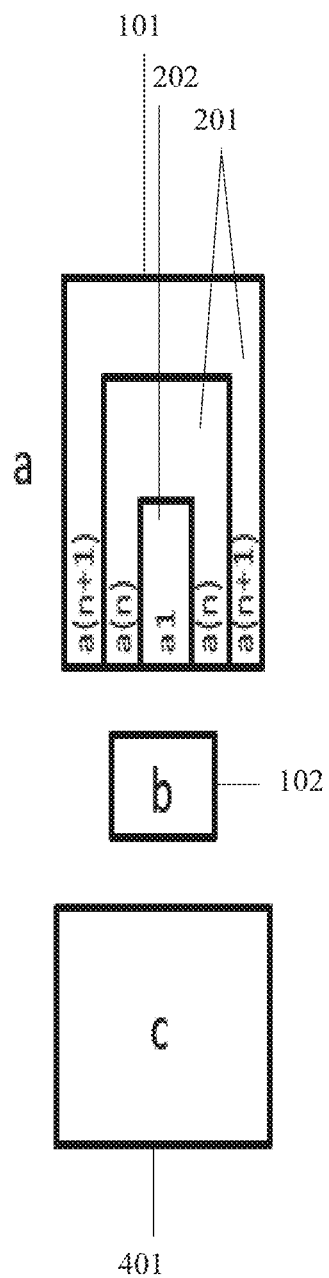
FIG. 5(a), FIG. 5(b), and FIG. 5(c) illustrate n-rectangle structure variations of a magnetic main pole, of a thermally assisted magnetic recording head, in accordance with an embodiment of the present application.
Figure 5:
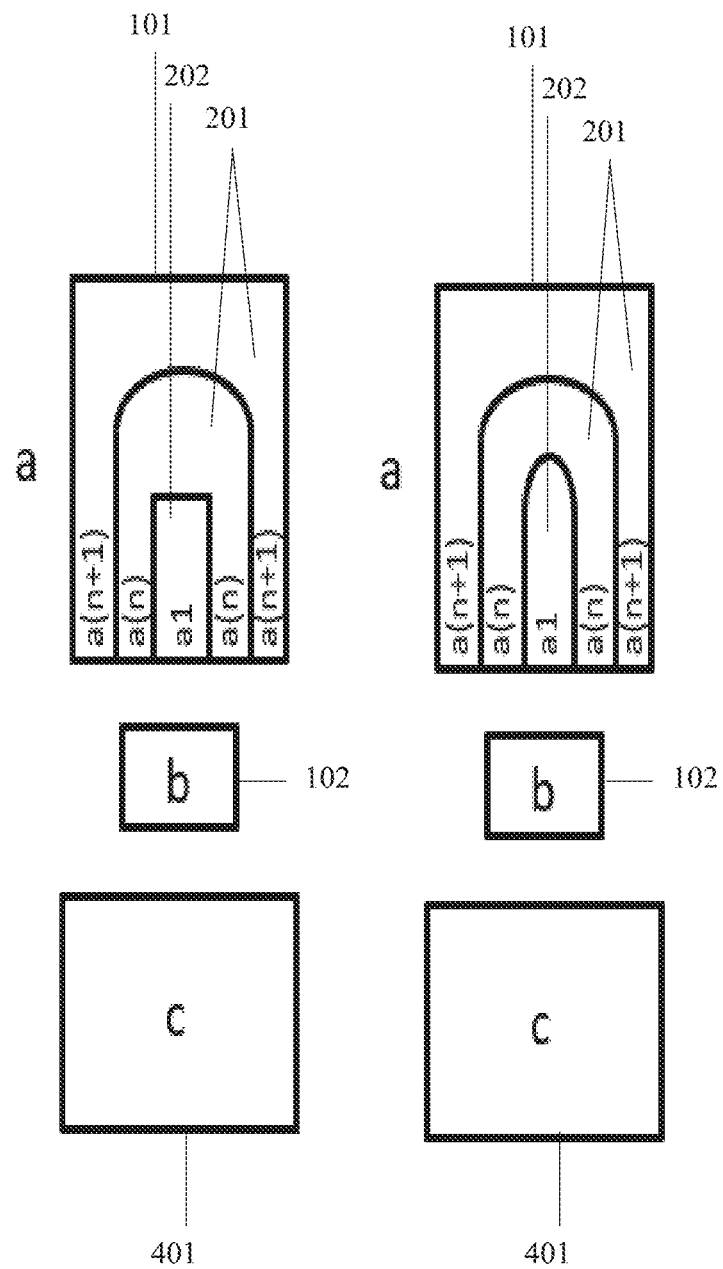
Figure 6:
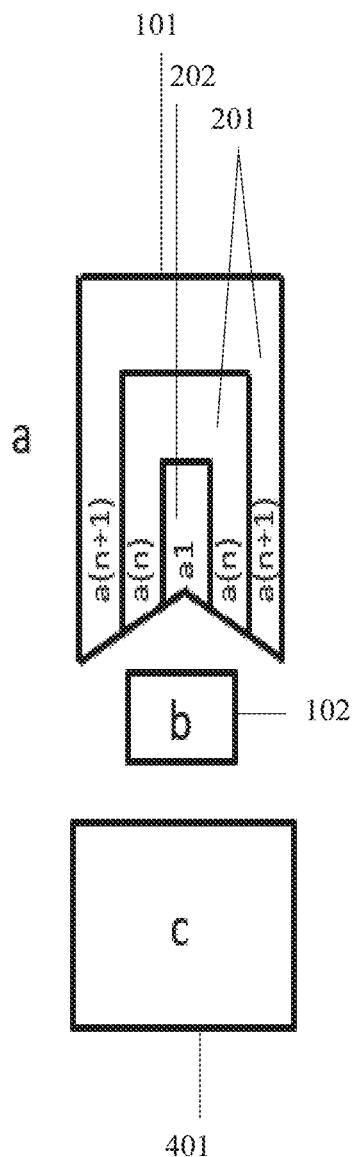
FIG. 6(a), FIG. 6(b), and FIG. 6(c) illustrate triangle shaped medium-facing surface structure variations of a magnetic main pole, of a thermally assisted magnetic recording head, in accordance with an embodiment of the present application.
Figure 6:
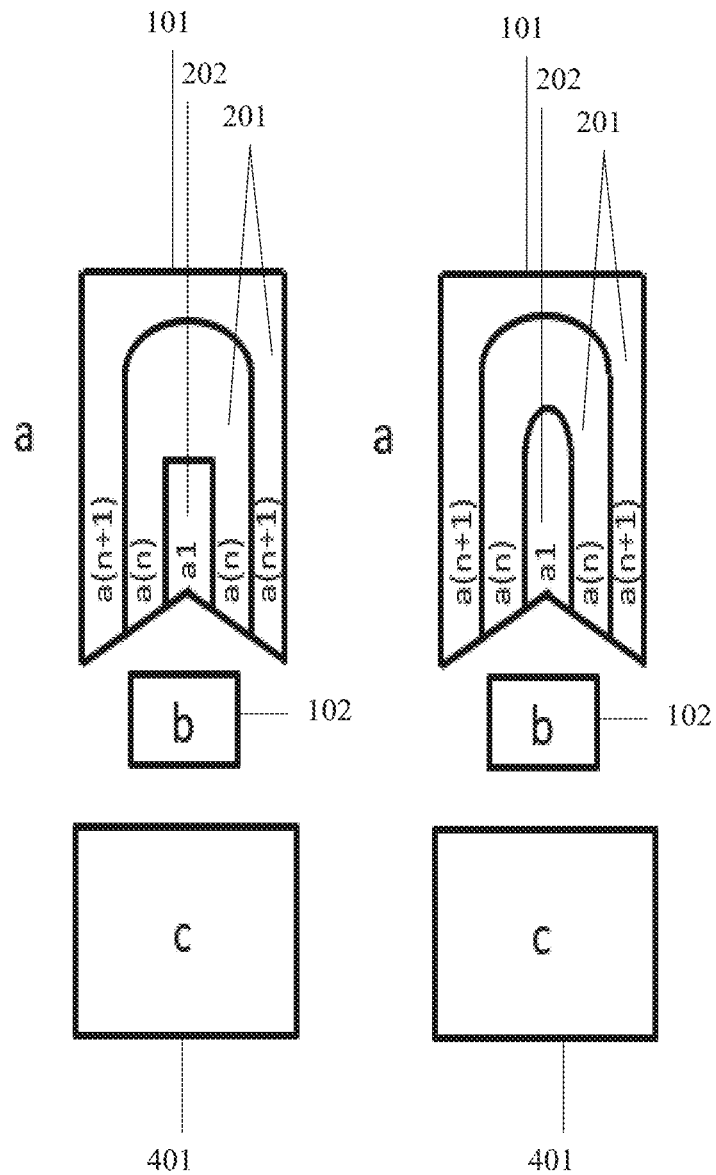
Figure 7:
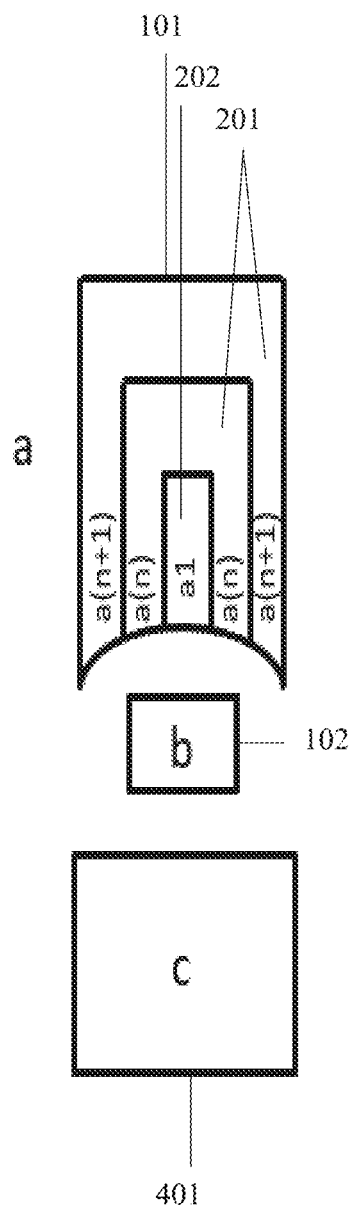
FIG. 7(a), FIG. 7(b), and FIG. 7(c) illustrate notch/curved shaped medium-facing surface structure variations of a magnetic main pole, of a thermally assisted magnetic recording head, in accordance with an embodiment of the present application.
Figure 7:
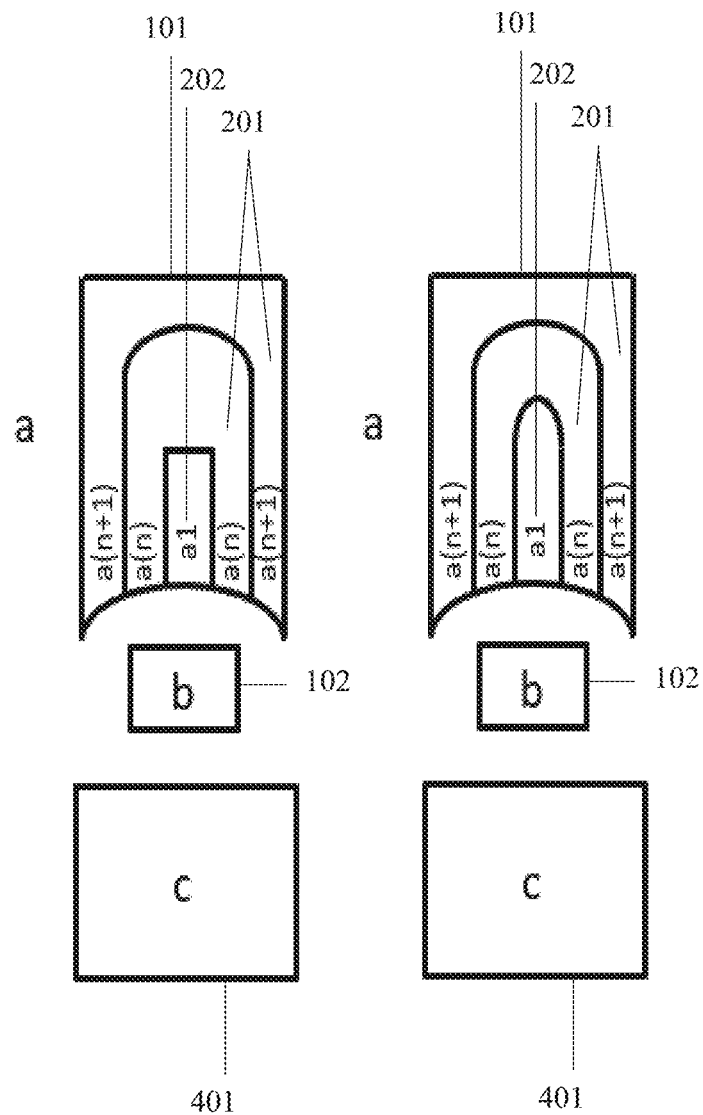

FIG. 5(a), FIG. 5(b), FIG. 5(c), FIG. 6(a), FIG. 6(b), FIG. 6(c), FIG. 7(a), FIG. 7(b), and FIG. 7(c) illustrate various levels a(n), a(n+1) . . . of the high saturated magnetic flux density material 201, along with different medium-facing surface structure variations of a magnetic main pole 101. In one embodiment, the magnetic flux density of the high saturated magnetic flux density material a(n+1) is greater than the magnetic flux density of another high saturated magnetic flux density material a(n), wherein 'n' is a positive integer. The magnetic flux density of the low saturated magnetic flux density or the non-magnetic material 202 at the center (a1) may be least as compared to a(n) and a(n+1). Thus, the magnetic flux density of the level a(n) of the high saturated magnetic flux density material 201 may always be higher than the saturation magnetic flux density of al. FIG. 5(a) to FIG. 5(c) illustrate an n-rectangle structure variation of a magnetic main pole 101 with a planar shaped medium-facing surface. Further, FIG. 6(a) to FIG. 6(c) illustrate a triangle shaped medium-facing surface structure variation of a magnetic main pole 101. FIG. 7(a) to FIG. 7(c) illustrate a notch/curved shaped medium-facing surface structure variation of a magnetic main pole 101.

Referring to FIG. 5(a), in one embodiment, at least one additional portion may comprise a third portion such as a(n+1), sandwiching a second portion such as a(n), along the horizontal direction of the magnetic main pole. The third portion may be made of a material having a third saturated magnetic flux density which may be higher than the second saturated magnetic flux density.

Referring to FIG. 4(a) to FIG. 4(g), in one embodiment, the first portion (a1) may be placed at a center of the magnetic main pole 101, and the at least one additional portion may comprise a second portion (a2) sandwiching the first portion (a1), along the horizontal direction of the magnetic main pole 101. The second portion may be made of a material having a second saturated magnetic flux density higher than the first saturated magnetic flux density. The cross-section of the first portion may be rectangular or semi-circle in shape. The magnetic main pole may have a notch shaped medium-facing surface or a planar medium-facing surface or a triangle shaped medium-facing surface.

In one embodiment, the peg 102 may be placed facing the linear horizontal direction of the magnetic main pole 101. Further, the waveguide 401 may be placed in front of the peg 102. The high saturated magnetic flux density material 201 may be placed at an outer side of the magnetic main pole 101 and the low saturated magnetic flux density material 202 may be placed at the center of the magnetic main pole 101 enabling generation of a magnetic field in a linear horizontal direction, from the outer side of the magnetic main pole 101 towards its center. Such structure of thermally assisted magnetic recording head 400 enables in creation of a weaker head field at the center (a1) of the magnetic main pole 101 and stronger head field at the outer side a(n+1) of the magnetic main pole 101. The magnetic main pole 101 may facilitate for writing of a thermally assisted magnetic recording medium. The waveguide 401 may facilitate for directing an energy. The planar plasmon generator (PPG) (not shown in FIGS. 4(a) to 7(c)) may be adjacent to the waveguide 401 and facilitate for turning the energy into a surface plasmon which travels down the peg 102 to heat the thermally assisted magnetic recording medium. The magnetic main pole 101 may comprise a first portion enabling a first magnetic field strength and at least one additional portion enabling a magnetic field strength stronger than the first magnetic field strength. The magnetic field of the magnetic main pole 101 along a horizontal direction thereof enables generation of a substantially straight transition curve while writing on the thermally assisted magnetic recording medium.

In one embodiment, magnetic field generated from outer side a(n) to center (a1) and then from center (a1) to outer side a(n) may be gradually changed along the horizontal direction of the magnetic main pole 101. The structure of the thermally assisted magnetic recording head 400, may enable in obtaining linear transition curvature 203 by linear density or increase in data rate. Side reading effect and transition side erase may be minimized. In addition, reader width may be released such that the reader reliability and performance can be improved.

Figure 8:
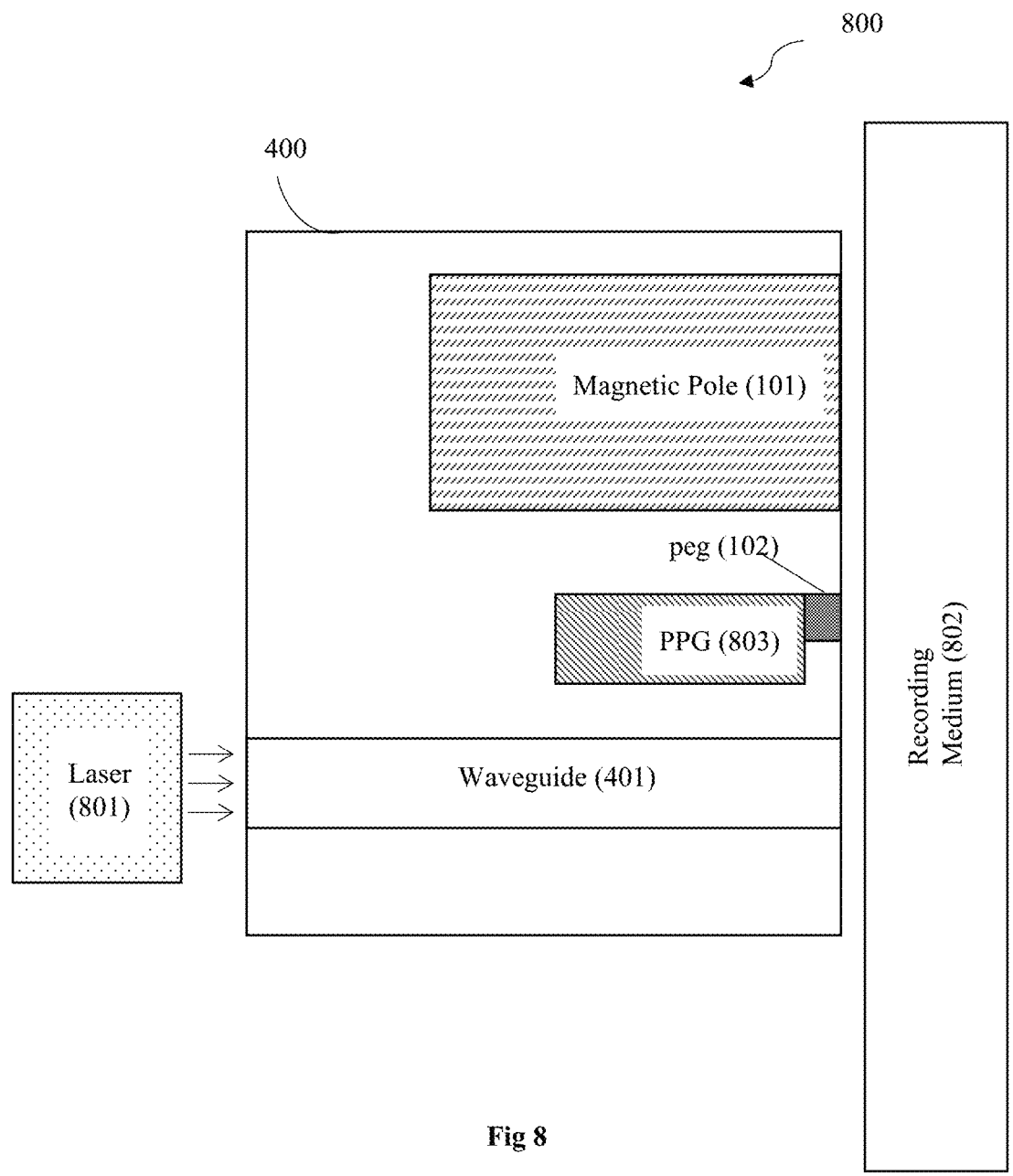
FIG. 8 illustrates a system for transition curvature improvement on a thermally assisted magnetic recording head.

Referring to FIG. 8, a system 800 for transition curvature improvement on a thermally assisted magnetic recording is illustrated in accordance with an embodiment of the present subject matter. In one embodiment, the system 800 may comprise an energy source 801 such as laser, a thermally assisted magnetic recording medium 802, the thermally assisted magnetic recording head 400 further comprising the magnetic main pole 101, the waveguide 401 and the planar plasmon generator 803 adjacent to the waveguide 401 and comprising a peg 102 with a front side proximal to the recording medium 802. In one embodiment, the waveguide 401 may carry light from the laser 801 to the planar plasmon generator (PPG) 803. That is, the energy produced by the laser 801 may be directed by the waveguide 401 to the planar plasmon generator 803. The planar plasmon generator 803 may absorb the energy and turn it into a surface plasmon. The surface plasmon may travel along the outside edge of the PPG 803 and down the peg 102 concentrating the surface plasmon and heating the precise point on the recording medium 802. The width of the peg 102 may be the width of the thermal zone on the recording medium 802. The planar plasmon generator (PPG) 803 may be integrated into a recording head. The peg 102 may be of rectangular or trapezoidal shape.

Figure 9:
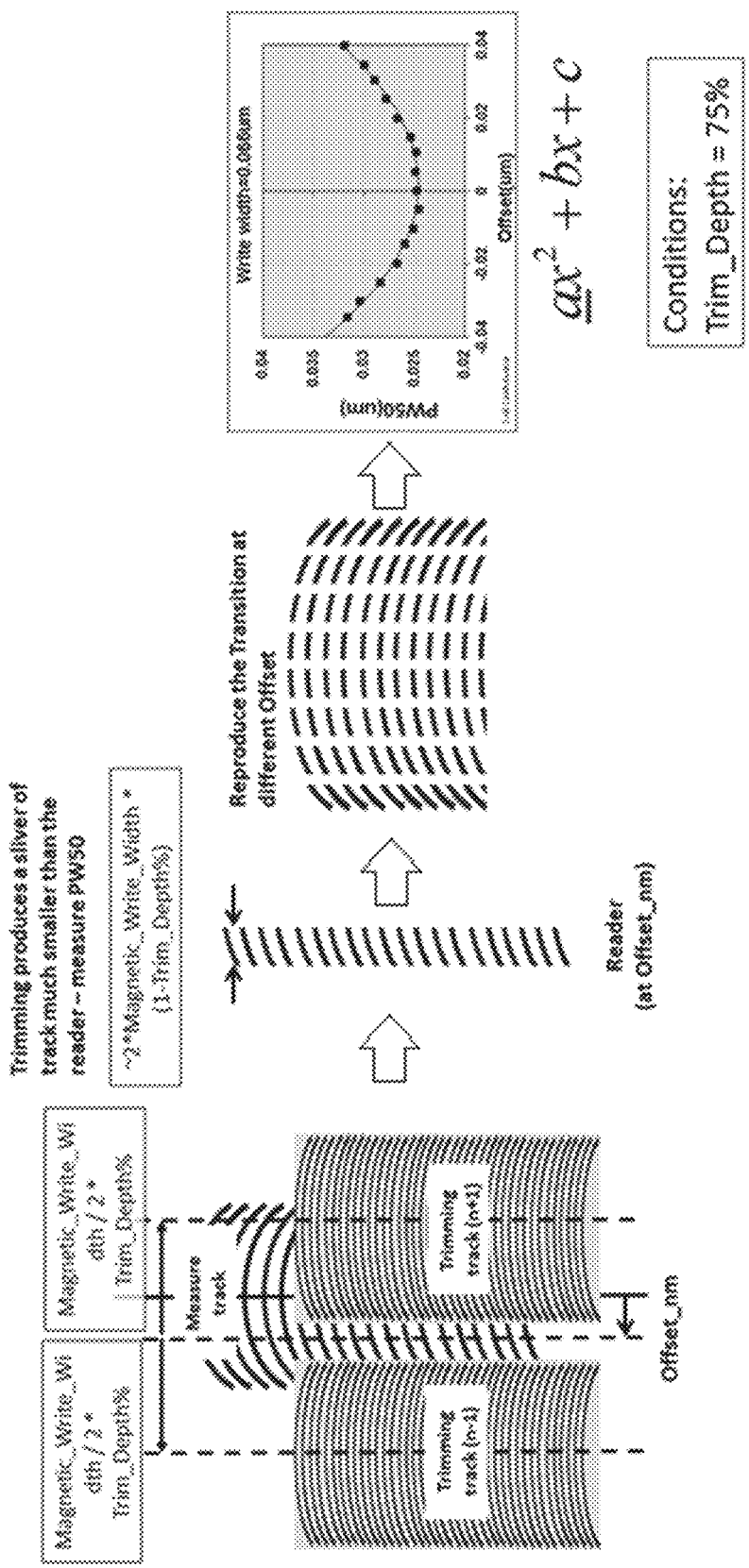
FIG. 9 illustrates a graph depicting "Across track trimmed PW50", in accordance with an embodiment of the present application.

Referring to FIG. 9, a graph depicting across track trimmed PW50, is illustrated in accordance with an embodiment of the present application. A trimmed PW50 may be originated from STX's which is used to determine how large of degree of transition curvature by Quadratic Factor. A written track may be trimmed on both sides of an offset position with [Offset−Magnetic_Write_Width/2*Trim_Depth %] for trimming track (n−1) and the offset of [Offset+Magnetic_Write_Width/2*Trim_Depth %] for trimming track (n+1) while Trim_Depth % may be 75%. The trimmed track width may be much narrower than the reader and the reader may measure PW50 of this trimmed track. Then writing the written track again on same position and then to trim on both sides with another offset position and measure PW50 again. Finally, combined different offset position correlated with the corresponding PW50 value, the transition curvature may be visualized. By fitting a quadratic equation on the data set of the offset position vs the corresponding PW50, coefficient of $X^2$ may be defined as the Quadratic Factor. Larger Quadratic factor, poor transition curvature or larger degree of transition curvature.

Figure 10A:
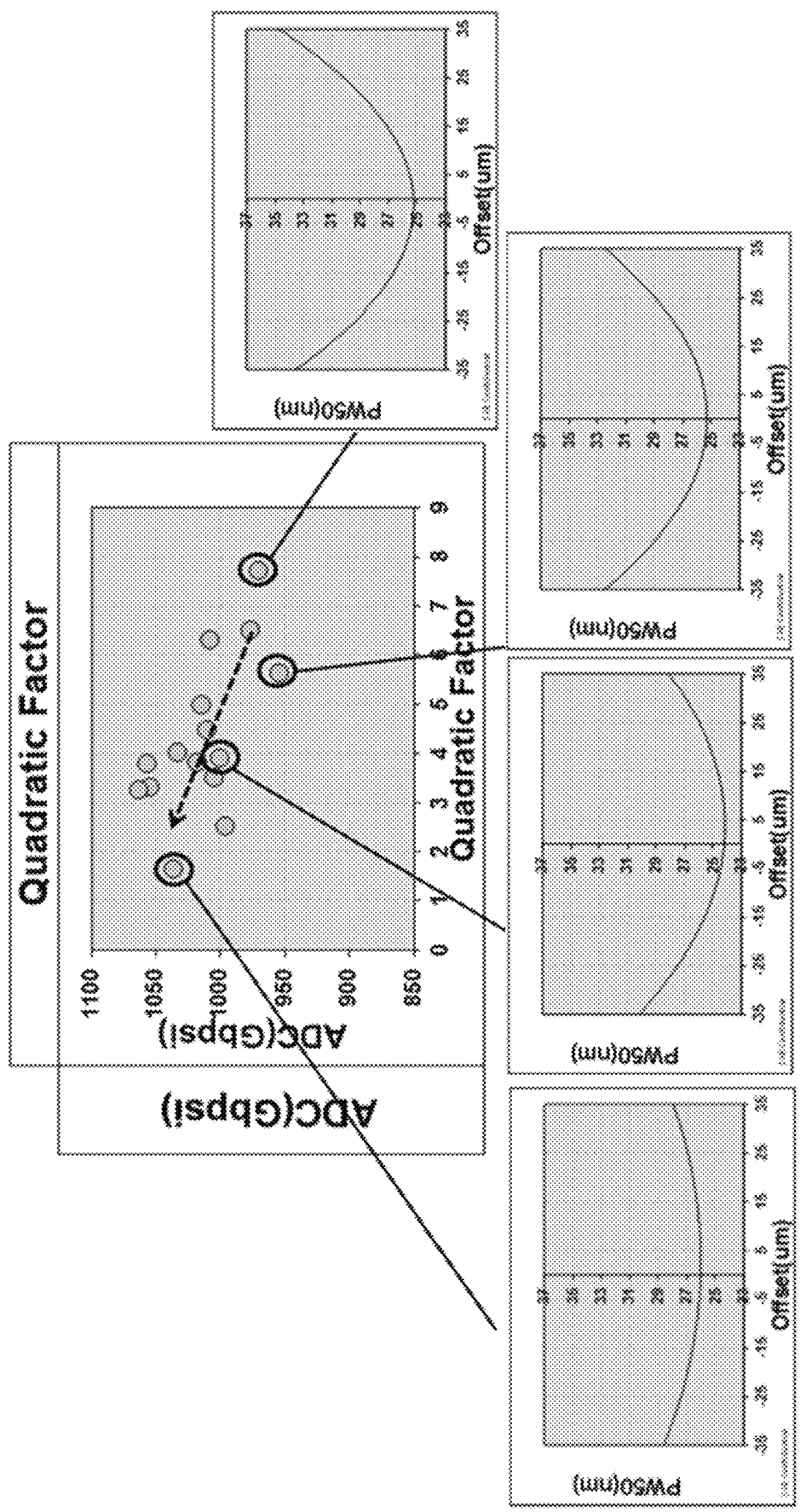
FIGS. 10(a) and 10(b) illustrate graphs depicting ADC vs Quadratic Factor, in accordance with embodiments of the present application.
Figure 10B:
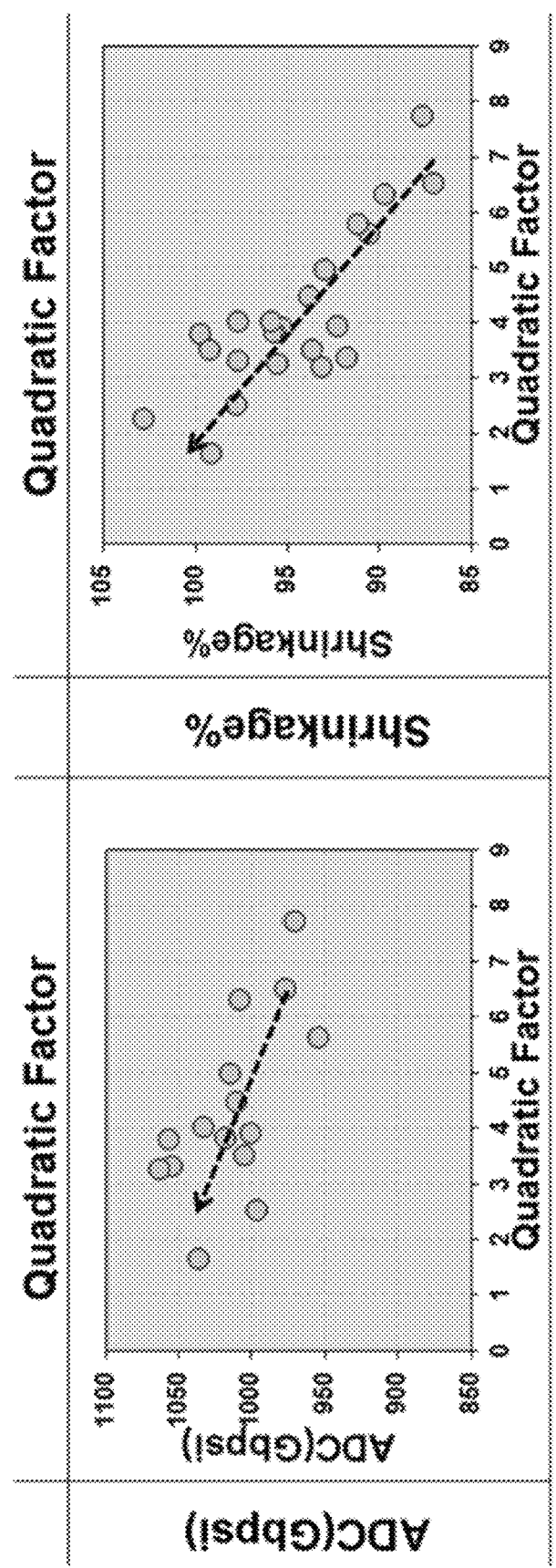

Referring to FIGS. 10(a) and 10(b), ADC vs Quadratic Factor is depicted, in accordance with embodiments of the present application. FIG. 10a shows the correlation of ADC vs Quadratic factor with corresponding curve of transition curvature. Smaller the Quadratic factor (less degree of transition curvature), larger the ADC. So, improvement of transition curvature can improve ADC directly. FIG. 10b plots the correlation of Shrinkage % vs Quadratic factor and ADC vs Quadratic factor. For larger degree of transition curvature (larger Quadratic factor value), the shrinkage of the track may be larger due to track edge to be overlapped from previous transition to next transition. Then track edge signal may become smaller or erased. 100% shrinkage represents no shrinkage effect on track. Smaller the shrinkage %, larger the shrinkage effect on track. So smaller the Quadratic factor, shrinkage % will be closer to 100% (no shrinkage effect). When Quadratic factor become smaller which result to better Shrinkage %, then data rate can be increased, and reader width can be released (better on track performance and better reliability with wider reader) such that ADC gain can be observed.

Although implementations for a system 800 for transition curvature improvement on a thermally assisted magnetic recording head 400 have been described in language specific to structural features and/or methods, it is to be understood that the appended claims are not necessarily limited to the specific features or methods described. Rather, the specific features and methods are disclosed as examples of implementations for system 800 for transition curvature improvement on a thermally assisted magnetic recording head 400.

What is claimed is:

1. A thermally assisted magnetic recording head, comprising:
    a magnetic main pole for writing of a thermally assisted magnetic recording medium;
    a waveguide for directing an energy; and
    a planar plasmon generator (PPG) comprising a peg and adjacent to the waveguide, the PPG being for turning the energy into a surface plasmon which travels down the peg to heat the thermally assisted magnetic recording medium;
    wherein the magnetic main pole comprises a first portion enabling a first magnetic field strength and at least one additional portion enabling a magnetic field strength stronger than the first magnetic field strength such that a magnetic field of the magnetic main pole along a horizontal direction thereof enables generation of a substantially straight transition curve while writing on the thermally assisted magnetic recording medium;
    wherein the first portion is made of a non-magnetic material or a magnetic material having a first saturated magnetic flux density, and each additional portion is made of a material having a saturated magnetic flux density higher than the first saturated magnetic flux density; and wherein the first portion is placed at a center of the magnetic main pole, and the at least one additional portion comprises a second portion sandwiching the first portion along the horizontal direction of the magnetic main pole, the second portion being made of a material having a second saturated magnetic flux density higher than the first saturated magnetic flux density, and the second portion being a single element surrounding a top side of the first portion that is opposite to the PPG, and a first side and a second side of the first portion, along the horizontal direction of the magnetic main pole;

wherein the at least one additional portion further comprises a third portion sandwiching the second portion along the horizontal direction of the magnetic main pole, the third portion being made of a material having a third saturated magnetic flux density higher than the second saturated magnetic flux density, and the third portion being a single element surrounding a top side of the second portion that is opposite to the PPG, and a first side and a second side of the second portion, along the horizontal direction of the magnetic main pole.

2. The thermally assisted magnetic recording head of claim 1, wherein a cross-section of the first portion is rectangular or semi-circle in shape.

3. The thermally assisted magnetic recording head of claim 1, wherein the magnetic main pole has a notch shaped medium-facing surface, a planar medium-facing surface, or a triangle shaped medium-facing surface.

4. A system for transition curvature improvement on thermally assisted magnetic recording, comprising:
   an energy source;
   a thermally assisted magnetic recording head comprising:
      a magnetic main pole for writing of a thermally assisted magnetic recording medium;
      a waveguide for directing an energy produced by the energy source; and
      a planar plasmon generator (PPG) comprising a peg and adjacent to the waveguide, the PPG being for turning the energy into a surface plasmon which travels down the peg to heat the thermally assisted magnetic recording medium;
      wherein the magnetic main pole comprises a first portion enabling a first magnetic field strength and at least one additional portion enabling a magnetic field strength stronger than the first magnetic field strength such that a magnetic field of the magnetic main pole along a horizontal direction thereof enables generation of a substantially straight transition curve while writing on the thermally assisted magnetic recording medium;

wherein the first portion is made of a non-magnetic material or a magnetic material having a first saturated magnetic flux density, and each additional portion is made of a material having a saturated magnetic flux density higher than the first saturated magnetic flux density; and wherein the first portion is placed at a center of the magnetic main pole, and the at least one additional portion comprises a second portion sandwiching the first portion along the horizontal direction of the magnetic main pole, the second portion being made of a material having a second saturated magnetic flux density higher than the first saturated magnetic flux density, and the second portion being a single element surrounding a top side of the first portion that is opposite to the PPG, and a first side and a second side of the first portion, along the horizontal direction of the magnetic main pole;

wherein the at least one additional portion further comprises a third portion sandwiching the second portion along the horizontal direction of the magnetic main pole, the third portion being made of a material having a third saturated magnetic flux density higher than the second saturated magnetic flux density, and the third portion being a single element surrounding a top side of the second portion that is opposite to the PPG, and a first side and a second side of the second portion, along the horizontal direction of the magnetic main pole.

5. The system for transition curvature improvement on thermally assisted magnetic recording of claim 4, wherein a cross-section of the first portion is rectangular or semi-circle in shape.

6. The system for transition curvature improvement on thermally assisted magnetic recording of claim 4, wherein the magnetic main pole has a notch shaped medium-facing surface, a planar medium-facing surface, or a triangle shaped medium-facing surface.

* * * * *